(12) United States Patent
West

(10) Patent No.: US 7,764,978 B1
(45) Date of Patent: Jul. 27, 2010

(54) SYSTEM AND METHOD FOR PROVIDING IN-BUILDING WIRELESS NETWORK COVERAGE

(75) Inventor: Barry John West, Reston, VA (US)

(73) Assignee: Nextel Communications Inc., Reston, VA (US)

( * ) Notice: Subject to any disclaimer, the term of this patent is extended or adjusted under 35 U.S.C. 154(b) by 1145 days.

(21) Appl. No.: 11/340,198

(22) Filed: Jan. 26, 2006

Related U.S. Application Data

(60) Provisional application No. 60/646,654, filed on Jan. 26, 2005.

(51) Int. Cl.
*H04M 1/00* (2006.01)

(52) U.S. Cl. .................. 455/561; 455/16; 455/524; 455/572; 370/338

(58) Field of Classification Search .............. 455/426.1, 455/426.2, 500, 507, 517, 524, 560, 561, 455/571, 572, 16; 370/328, 338
See application file for complete search history.

(56) References Cited

U.S. PATENT DOCUMENTS

| | | | | |
|---|---|---|---|---|
| 5,890,055 | A * | 3/1999 | Chu et al. ...................... | 455/16 |
| 6,229,432 | B1 * | 5/2001 | Fridley et al. .......... | 340/310.14 |
| 2001/0046840 | A1 * | 11/2001 | Kim .............................. | 455/7 |
| 2005/0157675 | A1 * | 7/2005 | Feder et al. ................. | 370/328 |
| 2005/0174539 | A1 * | 8/2005 | Walker et al. ............... | 352/100 |
| 2006/0059274 | A1 * | 3/2006 | Holloway et al. ............. | 710/2 |

\* cited by examiner

*Primary Examiner*—Nhan Le

(57) ABSTRACT

Systems and methods for providing in-building wireless network coverage are disclosed. An exemplary method for providing in-building wireless network coverage includes coupling a wireless repeater to an exterior power outlet of the building, and coupling a wireless in-building base station to an interior power outlet of the building. The exterior and interior power outlets are coupled to each other via the building's electrical power wiring. The wireless repeater forwards information received from a wireless macro network base station to the wireless in-building base station, and forwards information received from the wireless in-building base station to the wireless macro network base station.

20 Claims, 5 Drawing Sheets

SYSTEM AND METHOD FOR PROVIDING IN-BUILDING WIRELESS NETWORK COVERAGE

CROSS REFERENCE TO A RELATED APPLICATION

This application claims the benefit of the filing date of Provisional Patent Application Ser. No. 60/646,654, filed on Jan. 26, 2005, which is incorporated herein by reference.

BACKGROUND OF THE INVENTION

Decreasing costs of wireless communications, such as cellular communications, has resulted in many consumers relying upon wireless communications as their primary means of telephonic communication. Some consumers have completely switched their telephonic communications from landline (e.g., through a local exchange carrier "LEC" or a local phone company) to wireless communications. In addition to the decreasing costs of wireless communications, this switch is also occurring due to the convenience of having a single telephone and telephone number for all communications.

Although many consumers desire the simplicity afforded by using wireless communications in place of landline communications, not all consumers have this option. Specifically, many consumers reside in areas where their wireless service provider's service area (herein referred to as a "wireless macro network") does not provide adequate coverage. In some areas the wireless macro network may provide adequate coverage, however, due to the attenuation of wireless signals by the structure of the consumer's residence, the consumer cannot obtain adequate coverage within the residence.

In-building wireless network coverage can be provided using a PSTN or broadband wireless base station. These wireless base stations provide in-building coverage, and use a telephone line or broadband connection as a backhaul between the wireless base station and the wireless macro network. Broadband wireless base stations require customers to have broadband access, such as a cable or DSL modem, to provide a backhaul to the wireless macro network. PSTN wireless base stations occupy a customer's telephone line to provide a backhaul to the wireless macro network. Additionally, PSTN and broadband wireless base stations require specialized equipment in the wireless network to interface with the broadband or PSTN backhaul.

SUMMARY OF THE INVENTION

Accordingly, an aspect of the invention is to provide a system for in-building coverage, which is easy for a customer to install, and does not require the customer to provide the backhaul to the wireless macro network. Accordingly, the present invention provides systems and methods, which address the above-identified and other deficiencies of conventional techniques, for providing in-building wireless network coverage.

More specifically, another aspect of the invention relates to a system for providing wireless communication services within a structure, comprising an external transceiver situated at an exterior portion of the structure, wherein the external transceiver is adapted to wirelessly communicate with a base transceiver station of a communication system; an internal transceiver situated at an interior portion of the structure, wherein the internal transceiver is adapted to wirelessly communicate with one or more mobile stations (MS); and an electrical power distribution system of the structure, wherein the electrical power distribution system is adapted to route signals transmitted by the base transceiver station (BTS) from the external transceiver to the internal transceiver for subsequent transmission to the one or more mobile stations (MS), and wherein the electrical power distribution system is further adapted to route signals transmitted by the one or more mobile stations (MS) from the internal transceiver to the external transceiver for subsequent transmission to the base transceiver station (BTS).

Yet another aspect of the invention relates to an exemplary method for providing in-building wireless network coverage comprising coupling a wireless repeater to an exterior power outlet of the building, and coupling a wireless in-building base station to an interior power outlet of the building. The exterior and interior power outlets are coupled to each other via the building's electrical power wiring. The wireless repeater forwards information received from a wireless macro network base station to the wireless in-building base station, and forwards information received from the wireless in-building base station to the wireless macro network base station.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE EXEMPLARY EMBODIMENTS

Figure 1:
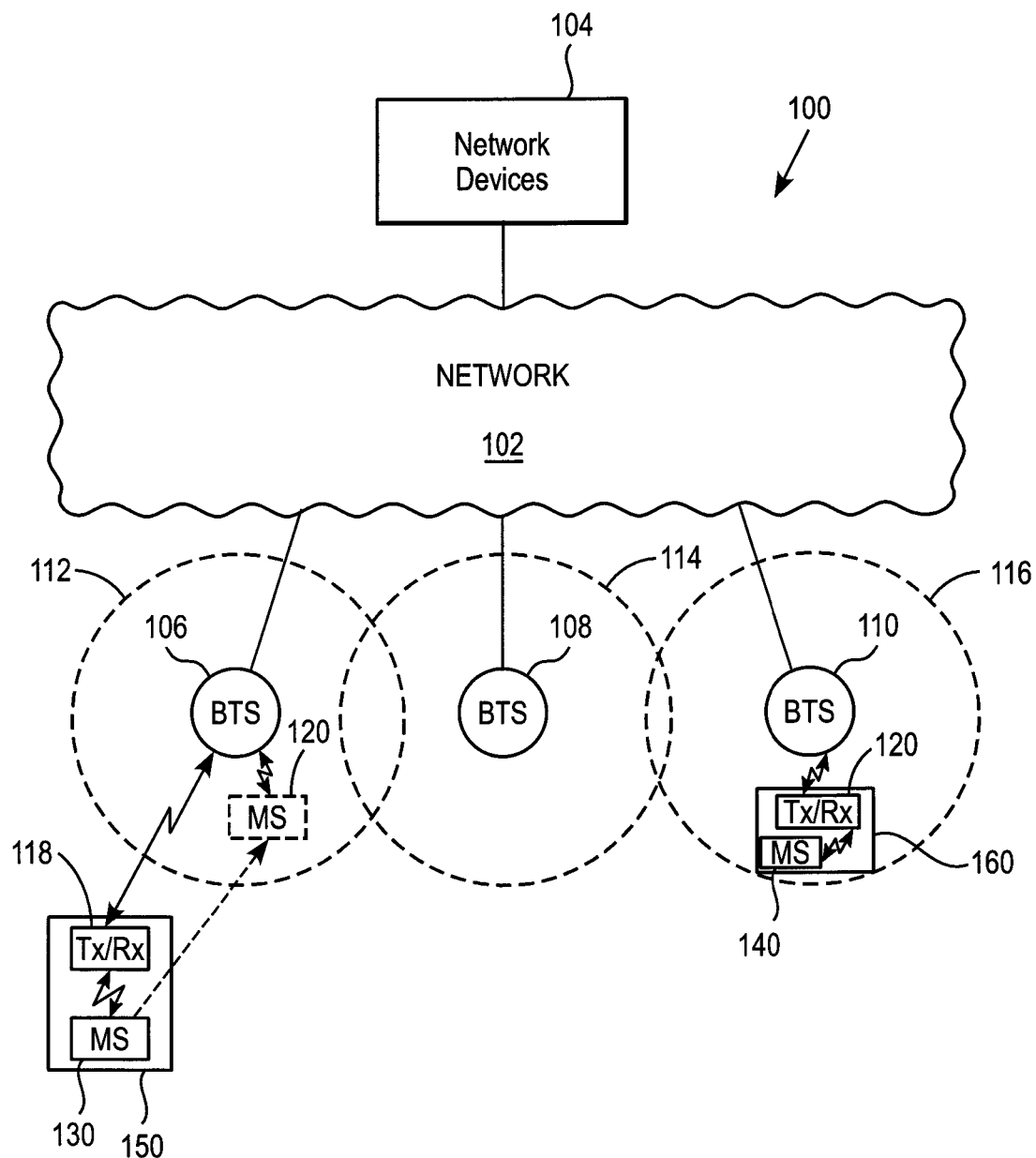
FIG. 1 illustrates an exemplary communication system in accordance with an embodiment of the invention.

FIG. 1 illustrates an exemplary communication system 100 in accordance with an embodiment of the invention. The communication system 100 comprises a communications network 102, a plurality of network devices 104 coupled to the communications network 102, and a plurality of base transceiver stations (BTS), three of which are shown as base transceiver stations (BTS) 106, 108, and 110 coupled to the communications network 102.

The network devices 104 may perform various functions for the communication system 100. For instance, the network devices 104 may assist in setting up interconnect (cellular) telephone calls, may assist in setting up dispatch communication sessions, may assist in generating voice packets for interconnect telephone calls and/or dispatch calls, may assist in providing an interface to a wide area network, such as the Internet, may assist in controlling the operations of the base transceiver stations (BTS) 106, 108, and 110. The functions of the network devices 104 may be numerous based on the particular requirements for the communication system 100.

The communications network 102 provides a communications medium to allow the network devices 104 and the base transceiver stations (BTS) 106, 108, and 110 to communicate with each other. The communications network 102 may be based on any type of technology, such as internet protocol (IP), asynchronous transfer mode (ATM), frame relay, any combination thereof, or others.

The base transceiver stations (BTS) 106, 108, and 110 each provide a communication interface between the wireless environment in which mobile stations (MS) reside and the wired environment of the communications network 102. Each base transceiver station (BTS) provides wireless communication services to mobile stations (MS) within a limited region. In this example, base transceiver stations (BTS) 106, 108, and 110 provide wireless communication service coverage to limited regions 112, 114, and 116, respectively.

As discussed in the Background section, in certain situations the wireless coverage of a communication system may not extend to certain regions. For instance, in some remote and sparsely-populated regions, such as rural, dessert, and mountainous regions, it may not be cost effective for a wireless service provider to provide base transceiver stations (BTS) and backhaul infrastructure to cover such regions.

Further, even within a coverage region of a communication network, there may still be pockets (sub-regions) where coverage is relatively poor. For example, the coverage inside of a certain building may be relatively poor for a number of reasons, such as due to signal interference by obstacles and/or the construction of the building. For instance, the coverage within building elevators is typically poor. Similarly, coverage within other structures, such as tunnels and subways, is also generally poor.

Referring again to FIG. 1, the communication system 100 further comprises a transceiver (Tx/Rx) 118 (e.g., a repeater) located on an external portion of a structure 150, such as a building. In this example, the structure 150 is located outside of the coverage region 112 of the nearest base transceiver station (BTS) 106. Under normal circumstances, without the use of the transceiver (Tx/Rx) 118, a nearby mobile station (MS) 130 would not receive wireless communication services from the communication system 100. However, because the transceiver (Tx/Rx) 118 is able to receive, boost and transmit the signal from the nearest base transceiver station (BTS) 106 to the mobile station (MS) 130, as well as receive, boost and transmit the signal from the mobile station (MS) 130 to the base transceiver station (BTS) 106, the mobile station (MS) may be able to receive wireless communication services from the communication system 100.

It shall be understood that the structure including the transceiver need not be outside of the coverage region of a base transceiver station (BTS). There may be situations where a structure is located in a relatively poor radio frequency (RF) environment, due to obstacles, such as mountain terrain, other buildings, etc. that interfere with the signals transmitted by the base transceiver station (BTS) and/or mobile stations (MS). Additionally, even the structure itself, may prevent the signal transmitted by a base transceiver station (BTS) from being properly received by mobile stations (MS) situated within the structure; and conversely, the structure itself may prevent the signals transmitted by mobile stations (MS) situated within the structure from properly being received by the base transceiver station (BTS).

In this particular example, a structure (e.g., a building) 160 is located within the coverage region 116 of the base transceiver station (BTS) 110. Because of the reasons mentioned above, the communication system 100 further includes a transceiver (Tx/Rx) 120 (e.g., a repeater) situated on the exterior portion of the structure 160. Accordingly, the transceiver (Tx/Rx) 120 is able to receive, boost and transmit the signal from the nearest base transceiver station (BTS) 110 to a mobile station (MS) 140 situated within the structure 160, as well as receive, boost and transmit the signal from the mobile station (MS) 140 to the base transceiver station (BTS) 110.

As discussed above, the transceivers (Tx/Rx) described herein effectively function as the corresponding base transceiver station (BTS) for the particular localized region. Thus, as illustrated in FIG. 1, if the mobile station (MS) 130, which is communicating with transceiver (Tx/Rx) within the structure 150, moves into the coverage region 112 of the base transceiver station (BTS) 106 (whose movement is shown as a dashed line), a handoff does not take place. Instead, the mobile station (MS) 130 merely begins to communicate with the base transceiver station (BTS) 106 directly, instead of through the transceiver (Tx/Rx) 118.

As discussed in more detail below, the communication system 100 includes an external transceiver (Tx/Rx) located on the outside of a structure, and an internal transceiver (Tx/Rx) located on the inside of the structure. The external transceiver (Tx/Rx) is communicatively coupled to the internal transceiver (Tx/Rx) by way of the electrical power distribution system of the structure. The external transceiver (Tx/Rx) communicates wirelessly with the corresponding base transceiver station (BTS). The internal transceiver (Tx/Rx) communicates wirelessly with one or more mobile stations (MS) residing within the structure. In a particular exemplary embodiment, the external transceiver (Tx/Rx) connects to an external outlet, and uses the external outlet to send and receive signals to and from the internal transceiver (Tx/Rx). Similarly, the internal transceiver (Tx/Rx) connects to an internal outlet, and uses the internal outlet to send and receive signals to and from the external transceiver (Tx/Rx).

Figure 2:
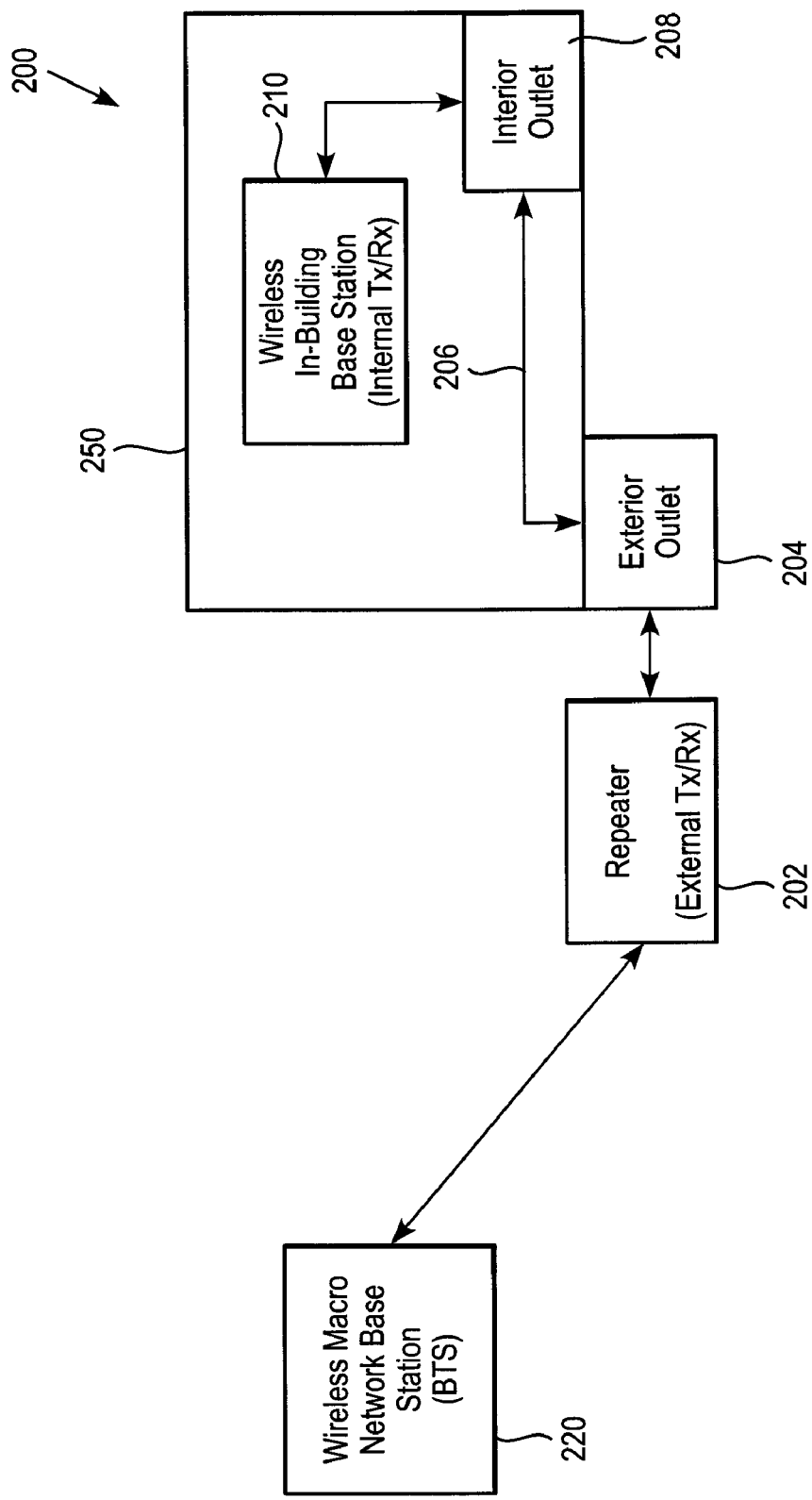
FIG. 2 illustrates an exemplary communication system for providing in-building wireless network coverage in accordance with another embodiment of the invention.

FIG. 2 illustrates an exemplary communication system 200 for providing in-building wireless network coverage in accordance with the present invention. In accordance with exemplary embodiments of the present invention, an external transceiver (Tx/Rx) 202 (e.g., a repeater) is provided to repeat signals received from a base transceiver station (BTS) 220 (the wireless macro network base station) to an internal transceiver (Tx/Rx) 210 (a wireless in-building base station), and signals received from the internal transceiver (Tx/Rx) 210 to the base transceiver station (BTS) 220. The external and internal transceivers (Tx/Rx) 202 and 210 may be able to support specific frequency bands, specific networks, e.g., Sprint-Nextel, Cingular, etc., or can support all frequency bands and/or networks.

The internal transceiver (Tx/Rx) 210 may appear to mobile stations (MS) located within the building, as a base transceiver station (BTS). However, the internal transceiver (Tx/Rx) 210 merely acts as a repeater for the base transceiver station (BTS) 220. Accordingly, when a mobile station (MS) moves from inside of the corresponding building 250 to outside, the mobile station (MS) may not perform a typical handoff, but instead may begin to communicate with the base transceiver station (BTS) 220 without attempting to register with the base transceiver station (BTS) 220. Similarly, the base transceiver station (BTS) 220 and the internal transceiver (Tx/Rx) 210 may not exchange the signaling, which is typically exchanged between base transceiver stations (BTS) during a handoff procedure.

The external transmitter (Tx/Rx) 202 is coupled to the internal transmitter (Tx/Rx) 210 via the building's electrical power distribution system 206 (e.g., the internal wiring of the building 250). Specifically, the external transmitter (Tx/Rx) 202 is coupled to an exterior outlet 204, which is in electrical communication with an interior outlet 208 which, in turn, is coupled to the internal transceiver (Tx/Rx) 210. The present invention may employ any known power line communication techniques, such as, Passport by Intelogis, Inc., PowerPacket by Intellon Corporation, (which has been chosen by the HomePlug Alliance), or the like.

Electrical wiring typically forms a circuit between a number of buildings and a pole transformer. Accordingly, the external transceiver (Tx/Rx) 210 may be plugged into an outlet outside of one of the buildings on the circuit with the best signal strength reception from the corresponding base transceiver station (BTS), and all mobile stations (MS) within all the buildings on the circuit may communicate with the base transceiver station (BTS) using the external transceiver (Tx/Rx) 202.

Figure 3:
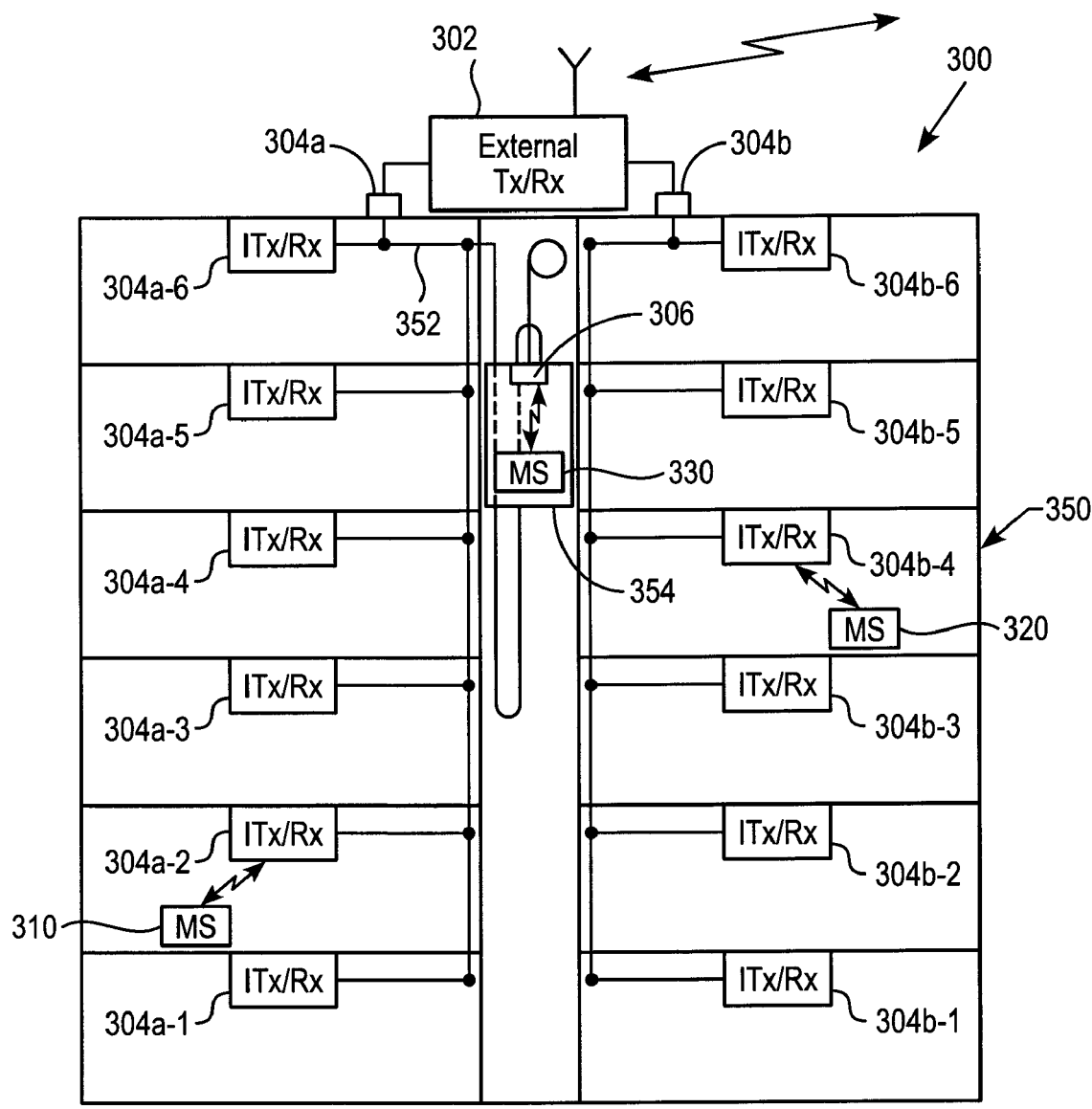
FIG. 3 illustrates another exemplary communication system for providing in-building wireless network coverage in accordance with another embodiment of the invention.

FIG. 3 illustrates another exemplary communication system 300 for providing in-building wireless network coverage in accordance with an embodiment of the invention. In this example, the building 350 is a multi-story building including an elevator 354 situated within an elevator shaft. Similar to the previous embodiment, the exemplary communication system 300 comprises an external transceiver (Tx/Rx) 302 and a plurality of internal transceivers (Tx/Rx) 304a1-6, 306b1-6, and 306. The external transceiver (Tx/Rx) 302 is coupled to the internal transceivers (Tx/Rx) 304a1-6, 306b1-6, and 306 by way of the building's electrical power distribution system 352.

As with the prior embodiment, the external transceiver Tx/Rx 302 receives signals from the corresponding base transceiver station (BTS), possibly boosts the signals, and sends the signals to the internal transceivers (Tx/Rx) 304a1-6, 306b1-6, and 306. The internal transceivers (Tx/Rx) 304a1-6, 306b1-6, and 306, in turn, transmit the signals from the base transceiver station (BTS) internally within the building 350. Conversely, the internal transceivers Tx/Rx 304a1-6, 306b1-6, and 306 receive the signals from mobile stations (MS) 310, 320, and 330 situated within the building 350, possibly boost the signals, and send the signals to the external transceiver (Tx/Rx) 302. The external transceiver (Tx/Rx) 302, in turn, transmits the signals to the corresponding base transceiver station (BTS).

In this example, which may relate to a relatively large multi-story building 350, there could be one or more internal transceivers (Tx/Rx) on each floor. For example, there could be two internal transceivers (Tx/Rx) on each floor, and located on different sides of the building. For instance, the first floor includes internal transceiver (Tx/Rx) 304a-1 on the "a" side of the building, and internal transceiver (Tx/Rx) 304b-1 on the "b" side of the building. Similarly, the second floor includes internal transceiver (Tx/Rx) 304a-2 on the "a" side of the building, and internal transceiver (Tx/Rx) 304b-2 on the "b" side of the building. The remaining floors could be similarly structured.

In addition, the building's elevators, such as elevator 354 in this example, may also include an internal transceiver Tx/Rx, such as transceiver 306. The electrical power distribution system 352 of the building 350, which supplies electrical power to the elevator 354 for the elevator control panel and lighting, may also be used to communicatively couple the external transceiver (Tx/Rx) 302 to the internal transceiver (Tx/Rx) 306 situated within the elevator 354. In this way, mobile stations (MS) situated inside of elevators, such as mobile station (MS) 330, are able to communicate with the communication system through the corresponding base transceiver station (BTS).

Figure 4:
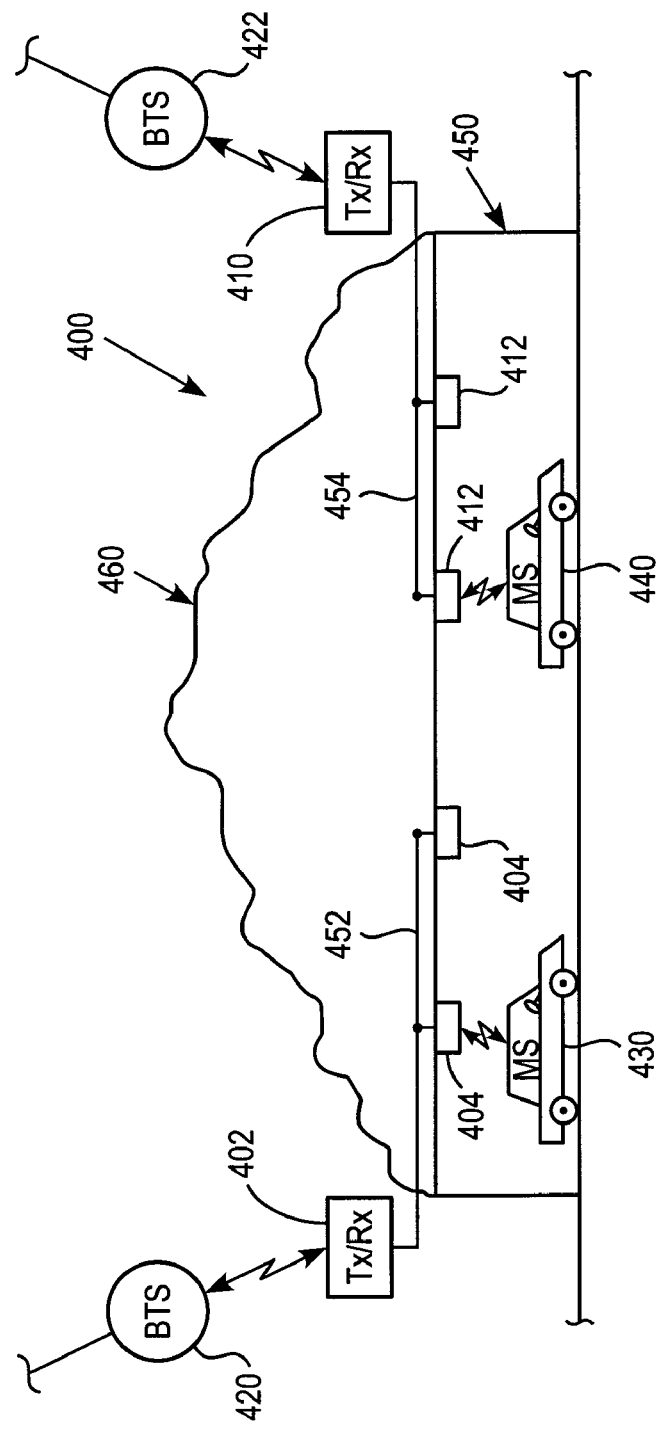
FIG. 4 illustrates an exemplary communication system for providing in-tunnel wireless network coverage in accordance with another embodiment of the invention.

FIG. 4 illustrates an exemplary communication system 400 for providing in-tunnel wireless network coverage in accordance with another embodiment of the invention. The structure for the purpose of providing wireless communication service coverage within, need not be limited to buildings; but, may encompass other structures including tunnels, subways, and others. Depending on the size and/or length of the structure, a communication system may have more than one external transceiver (Tx/Rx) to provide adequate wireless communication service coverage within the entire structure.

In this example, the communication system 400 provides wireless communication service coverage within a tunnel 450 situated under a mountainous terrain 460. It shall be understood that the tunnel 450 could also exist under a sea bed as well. Also, in this example, the mountainous terrain 460 as well as possibly the length of the tunnel 450 may require the communication system 400 to have a first external transceiver (Tx/Rx) 402 situated at an end of the tunnel 450, and a second external transceiver 410 situated at the other end of the tunnel 450. The first external transceiver (Tx/Rx) 402 is adapted to communicate wirelessly with a first base transceiver station (BTS) 420, and the second external transceiver (Tx/Rx) 410 is adapted to communicate wirelessly with a second base transceiver station (BTS) 422.

In this example, the first external transceiver (Tx/Rx) 402 is communicatively coupled to one or more internal transceivers (Tx/Rx) 404 by way of a first electrical power distribution system 452 of the tunnel 450. The first electrical power distribution system 452 may supply power to a first portion of the internal lighting of the tunnel 450 and possibly other equipment. Similarly, the second external transceiver (Tx/Rx) 410 is communicatively coupled to one or more internal transceivers (Tx/Rx) 412 by way of a second electrical power distribution system 454 of the tunnel 450. The second electrical power distribution system 454 may supply power to a second portion of the internal lighting of the tunnel 450 and possibly other equipment.

Accordingly, mobile stations (MS) inside vehicles within the tunnel may communicate with a base transceiver stations (BTS) of a communication system by way of internal and external transceivers (Tx/Rx) coupled to each other by an electrical power distribution system. For instance, the mobile station (MS) 430 is able to communicate with the communication system by way of internal transceiver (Tx/Rx) 404, first electrical power distribution system 452, first external transceiver (Tx/Rx) 402, and first base transceiver station (420). Similarly, the mobile station (MS) 440 is able to communicate with the communication system by way of internal transceiver (Tx/Rx) 412, second electrical power distribution system 454, second external transceiver (Tx/Rx) 410, and second base transceiver station 422.

Figure 5:
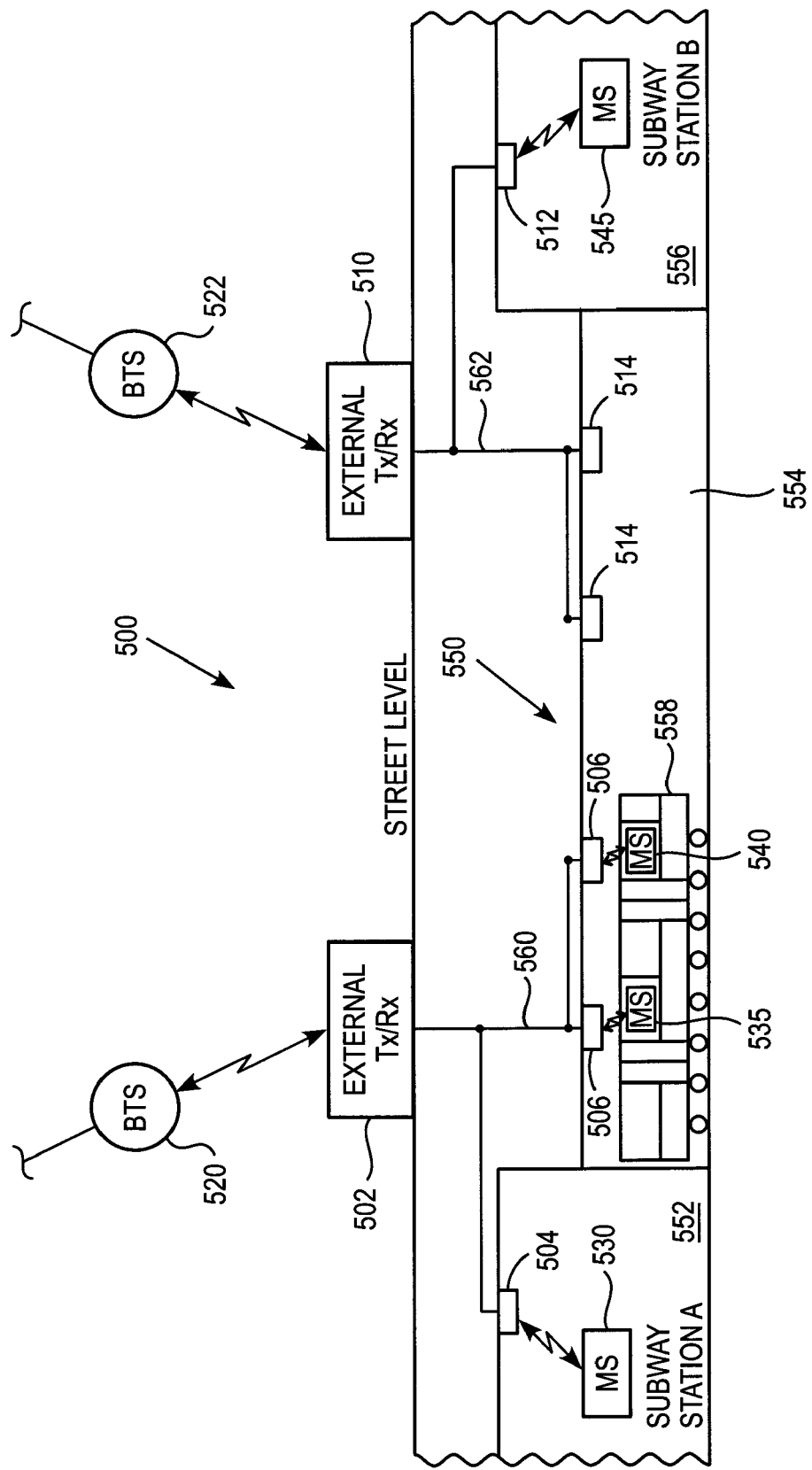
FIG. 5 illustrates an exemplary communication system for providing in-subway system wireless network coverage in accordance with another embodiment of the invention.

FIG. 5 illustrates an exemplary communication system 500 for providing in-subway system wireless network coverage in accordance with another embodiment of the invention. In this example, the communication system 500 provides wireless communication service coverage within a subway system 550. As with the prior example, the characteristics of the subway system 550, for example, the length between adjacent subway stations may require the communication system 500 to have a first external transceiver (Tx/Rx) 502 situated proximate a first subway station A 552, and a second external transceiver 510 situated proximate a second subway station B 556. The first external transceiver (Tx/Rx) 502 is adapted to communicate wirelessly with a first base transceiver station (BTS) 520, and the second external transceiver (Tx/Rx) 510 is adapted to communicate wirelessly with a second base transceiver station (BTS) 522.

In this example, the first external transceiver (Tx/Rx) 502 is communicatively coupled to one or more internal transceivers (Tx/Rx) 504 and 506 by way of a first electrical power distribution system 560 of the subway system 550. The first electrical power distribution system 560 may supply power to a first portion of the internal lighting of the subway system 550 and possibly other equipment. In this example, one or more internal transceivers (Tx/Rx) 504 are located at subway station A 552, and one or more internal transceivers (Tx/Rx) 506 are located within a subway tunnel 554 between adjacent subway stations A 552 and B 556.

Similarly, the second external transceiver (Tx/Rx) 510 is communicatively coupled to one or more internal transceivers (Tx/Rx) 512 and 514 by way of a second electrical power distribution system 562 of the subway system 550. The second electrical power distribution system 562 may supply power to a second portion of the internal lighting of the subway system 550 and possibly other equipment. In this example, one or more internal transceivers (Tx/Rx) 512 are located at subway station B 556, and one or more internal transceivers (Tx/Rx) 514 are located within the subway tunnel 554 between adjacent subway stations A 552 and B 556.

Accordingly, mobile stations (MS) inside a subway system may communicate with the base transceiver stations (BTS) of a communication system by way of internal and external transceivers (Tx/Rx) coupled to each other by an electrical power distribution system. For instance, the mobile station (MS) 530 residing in subway station A 552 is able to communicate with the communication system by way of internal transceiver (Tx/Rx) 504, first electrical power distribution system 560, first external transceiver (Tx/Rx) 502, and first base transceiver station (BTS) 520. Similarly, the mobile stations (MS) 535 and 540 residing in a subway train 558 within the subway tunnel 554 are able to communicate with the communication system by way of internal transceivers (Tx/Rx) 506, first electrical power distribution system 560, first external transceiver (Tx/Rx) 502, and first base transceiver station (BTS) 520. The mobile station (MS) 545 residing in subway station B 556 is able to communicate with the communication system by way of internal transceiver (Tx/Rx) 512, second electrical power distribution system 562, second external transceiver (Tx/Rx) 510, and second base transceiver station (BTS) 522.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for providing wireless communication services within a structure, comprising:
    an external transceiver situated at an exterior portion of said structure, wherein said external transceiver is adapted to wirelessly communicate with a base transceiver station (BTS) of a communication system;
    an internal transceiver situated at an interior portion of said structure, wherein said internal transceiver is adapted to wirelessly communicate with one or more mobile stations (MS); and
    an electrical power distribution system of said structure, wherein said electrical power distribution system is adapted to route signals transmitted by said base transceiver station (BTS) from said external transceiver to said internal transceiver for subsequent transmission to said one or more mobile stations (MS), and wherein said electrical power distribution system is further adapted to route signals transmitted by said one or more mobile stations (MS) from said internal transceiver to said external transceiver for subsequent transmission to said base transceiver station (BTS).

2. A system for providing wireless communication services within a structure, comprising:
    a first external transceiver situated at an exterior portion of said structure, wherein said first external transceiver is adapted to wirelessly communicate with a base transceiver station (BTS) of a communication system;
    a first internal transceiver situated at an interior portion of said structure, wherein said first internal transceiver is adapted to wirelessly communicate with one or more mobile stations (MS);
    a first electrical power distribution system of said structure, wherein said first electrical power distribution system is adapted to route signals transmitted by said base transceiver station (BTS) from said external transceiver to said internal transceiver for subsequent transmission to said one or more mobile stations (MS), and wherein said first electrical power distribution system is further adapted to route signals transmitted by said one or more mobile stations (MS) from said first internal transceiver to said external transceiver for subsequent transmission to said base transceiver station (BTS);
    an additional external transceiver situated at another exterior portion of said structure, wherein said additional external transceiver is adapted to wirelessly communicate with another base transceiver station (BTS) of said communication system;
    an additional internal transceiver situated at another interior portion of said structure, wherein said additional internal transceiver is adapted to wirelessly communicate with another one or more mobile stations (MS); and
    an additional electrical power distribution system of said structure, wherein said additional electrical power distribution system is adapted to route signals transmitted by said another base transceiver station (BTS) from said additional external transceiver to said additional internal transceiver for subsequent transmission to said another one or more mobile stations (MS), and wherein said additional electrical power distribution system is further adapted to route signals transmitted by said another one or more mobile stations (MS) from said additional internal transceiver to said additional external transceiver for subsequent transmission to said another base transceiver station (BTS).

3. The system of claim 2, wherein said electrical power distribution system comprises an external outlet, and wherein said external transceiver is communicatively coupled to said electrical power distribution system by way of said external outlet.

4. The system of claim 2, wherein said electrical power distribution system comprises an internal outlet, and wherein said internal transceiver is communicatively coupled to said electrical power distribution system by way of said internal outlet.

5. The system of claim 2, further comprising one or more additional internal transceivers communicatively coupled to said external transceiver by way of said electrical power distribution system.

6. The system of claim 2, wherein said structure comprises a building.

7. The system of claim 6, wherein said first internal transceiver is located within an elevator of said building.

8. The system of claim 2, wherein said structure comprises a tunnel.

9. The system of claim 2, wherein said structure comprises a subway system.

10. A communications system, comprising:
a communications network;
a plurality of network devices coupled to said communications network;
a plurality of base transceiver stations (BTS) coupled to said communications network;
an external transceiver situated at an exterior portion of a structure, wherein said external transceiver is adapted to wirelessly communicate with one of said base transceiver stations (BTS); and
an internal transceiver situated at an interior portion of said structure, wherein said internal transceiver is adapted to wirelessly communicate with one or more mobile stations (MS);
wherein said external and internal transceivers are adapted to communicate with each other by way of an electrical power distribution system that routes signals transmitted by said one of said base transceiver stations (BTS) from said external transceiver to said internal transceiver for subsequent transmission to said one or more mobile stations (MS), and routes signals transmitted by said one or more mobile stations (MS) from said internal transceiver to said external transceiver for subsequent transmission to said one of said base transceiver stations (BTS).

11. A communication system, comprising:
a communications network;
a plurality of network devices coupled to said communications network;
a plurality of base transceiver stations (BTS) coupled to said communications network;
an external transceiver situated at an exterior portion of a structure, wherein said external transceiver is adapted to wirelessly communicate with one of said base transceiver stations (BTS); and
an internal transceiver situated at an interior portion of said structure, wherein said internal transceiver is adapted to wirelessly communicate with one or more mobile stations (MS),
wherein said external and internal transceivers are adapted to communicate with each other by way of an electrical power distribution system that routes signals transmitted by said one of said base transceiver stations (BTS) from said external transceiver to said internal transceiver for subsequent transmission to said one or more mobile stations (MS), and routes signals transmitted by said one or more mobile stations (MS) from said internal transceiver to said external transceiver for subsequent transmission to said one of said base transceiver stations (BTS);
an additional external transceiver situated at another exterior portion of said structure, wherein said additional external transceiver is adapted to wirelessly communicate with another base transceiver station of said communication system; and
an additional internal transceiver situated at another interior portion of said structure, wherein said another internal transceiver is adapted to wirelessly communicate with another one or more mobile stations (MS);
wherein said additional external transceiver and said additional internal transceiver are adapted to communicate with each other by way of an additional electrical power distribution system of said structure that routes signals transmitted by said another base transceiver station (BTS) from said additional external transceiver to said additional internal transceiver for subsequent transmission to said another one or more mobile stations (MS), and routes signals transmitted by said another one or more mobile stations (MS) from said additional internal transceiver to said additional external transceiver for subsequent transmission to said another base transceiver station (BTS).

12. The communication system of claim 11, wherein said electrical power distribution system comprises an external outlet, and wherein said external transceiver is communicatively coupled to said electrical power distribution system by way of said external outlet.

13. The communication system of claim 11, wherein said electrical power distribution system comprises an internal outlet, and wherein said internal transceiver is communicatively coupled to said electrical power distribution system by way of said internal outlet.

14. The communication system of claim 11, further comprising one or more additional internal transceivers communicatively coupled to said external transceiver by way of said electrical power distribution system.

15. The communication system of claim 11, wherein said structure comprises a building.

16. The communication system of claim 15, wherein said first internal transceiver is located within an elevator of said building.

17. The communication system of claim 11, wherein said structure comprises a tunnel.

18. The system of claim 11, wherein said structure comprises a subway system.

19. A method for providing in-building wireless network coverage, comprising:
coupling a wireless repeater to an exterior power outlet of the building;
communicatively coupling a wireless in-building base station to an interior power outlet of the building, wherein the exterior and interior power outlets are communicatively coupled to each other via the building's electrical power wiring, and the wireless repeater forwards information received from a wireless macro network base station to the wireless in-building base station via the building's electrical power wiring, and forwards information received from the wireless in-building base station to the wireless macro network base station via the building's electrical power wiring.

20. The method of claim 19, further comprising the acts of:
coupling another wireless in-building base station to another interior power outlet of another building, wherein the another building is on a same circuit as the building.

* * * * *